(12) United States Patent
Elsen et al.

(10) Patent No.: US 8,619,627 B2
(45) Date of Patent: Dec. 31, 2013

(54) AUTOMATIC DETERMINATION OF GROUPINGS OF COMMUNICATIONS INTERFACES

(75) Inventors: Christian Elsen, Rolle (CH); Pierre-Emmanuel Ettori, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 429 days.

(21) Appl. No.: 12/711,408

(22) Filed: Feb. 24, 2010

(65) Prior Publication Data

US 2011/0206058 A1 Aug. 25, 2011

(51) Int. Cl.
*H04L 12/28* (2006.01)

(52) U.S. Cl.
USPC .......................................................... 370/254

(58) Field of Classification Search
None
See application file for complete search history.

(56) References Cited

U.S. PATENT DOCUMENTS

| | | | |
|---|---|---|---|
| 2009/0109998 A1* | 4/2009 | Vinayagam et al. | 370/465 |
| 2009/0225752 A1* | 9/2009 | Mitsumori | 370/390 |
| 2011/0110382 A1 | 5/2011 | Jabr et al. | |
| 2011/0131625 A1* | 6/2011 | Schlack | 725/116 |

OTHER PUBLICATIONS

"Cisco Catalyst 6500 Series Virtual Switching System (VSS) 1440," Cisco Systems, Inc., San Jose, CA, 2009, (seventy-one pages).
Understanding EtherChannel Load Balancing and Redundancy on Catalyst Switches, Cisco Systems, Inc., San Jose, CA, Jul. 9, 2007 (nine pages).

* cited by examiner

*Primary Examiner* — Marcus R Smith
(74) *Attorney, Agent, or Firm* — The Law Office of Kirk D. Williams (57) ABSTRACT

A particular networked machine broadcasts packets from its interfaces resulting in patterns of returned copies of the sent broadcast packets received on its interfaces. Based on these patterns, a determination is made to identify groupings of one or more of the interfaces that are considered by remote devices as being grouped together, as a broadcast packet transmitted from an interface belonging to a grouping will be received on, and only on, a single interface in each of the other groupings, with a grouping being one or more interfaces. In one implementation, a grouping is defined as a single independent interface, or an aggregation of two or more interfaces combined into a single logical interface, such as, but not limited to that of a PortChannel.

20 Claims, 9 Drawing Sheets

TMP_NODE LIST
(E.G., TEMPORARY STORAGE
FOR INTERFACES THAT MUST BE
IN DIFFERENT ONES OF THE
LISTED GROUPS)

AUTOMATIC DETERMINATION OF GROUPINGS OF COMMUNICATIONS INTERFACES

TECHNICAL FIELD

The present disclosure relates generally to communications systems.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

A communications device typically includes multiple interfaces for communication with other devices. PortChannel is a technology that aggregates multiple interfaces into a single logical interface, and thus provides, inter alia, aggregate bandwidth and load balancing capabilities, and appears to higher-level protocols as a single logical interface. It is important that each side of a link that is part of a PortChannel is configured to act accordingly.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with automatically determining groupings of communications interfaces. One embodiment performs a method, comprising: transmitting, by a networked particular machine including a plurality of interfaces with each configured for sending and receiving packets over a communications link, a broadcast packet from each of an exercised plurality of interfaces of the plurality of interfaces; and receiving each of the transmitted broadcast packets on one or more of the plurality of interfaces; wherein the plurality of interfaces includes the exercised plurality of interfaces; analyzing the patterns of each particular broadcast packet transmitted from one of the exercised plurality of interfaces and on which of the plurality of interfaces said particular broadcast packet was received in order to determine a plurality of groupings of one or more of the plurality of interfaces; wherein a broadcast packet transmitted from an interface belonging to a grouping will be received on, and only on, a single interface in each of the other plurality of groupings.

In one embodiment, a grouping is defined as a single independent interface, or an aggregation of two or more interfaces combined into a single logical interface, such as, but not limited to that of a PortChannel. One embodiment includes transmitting, by the networked particular machine, an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission. One embodiment includes: comparing said determined plurality of groupings with a predefined configuration; and providing a notification of whether the predefined configuration matches said determined plurality of groupings. In one embodiment, the exercised plurality of interfaces includes all of the plurality of interfaces. In one embodiment, said broadcast packets are Layer-2 frames.

2. Description

Disclosed are, inter alia, methods, apparatus, computer-storage media, mechanisms, and means associated with automatically determining groupings of communications interfaces. A particular networked machine broadcasts packets from its interfaces resulting in patterns of returned copies of the sent broadcast packets received on its interfaces. Based on these patterns, a determination is made to identify groupings of one or more of the interfaces that are considered by remote devices as being grouped together, as a broadcast packet transmitted from an interface belonging to a grouping will be received on, and only on, a single interface in each of the other groupings, with a grouping being one or more interfaces. In one implementation, a grouping is defined as a single independent interface, or an aggregation of two or more interfaces combined into a single logical interface, such as, but not limited to that of a PortChannel.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processing elements, ASICs, methods, and computer-readable media containing instructions. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although any embodiment may include some, all or none of the features, elements and/or limitations described in relation to a particular different one embodiment. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

One embodiment includes a method, including: transmitting, by a networked particular machine including a plurality of interfaces with each configured for sending and receiving packets over a communications link, a broadcast packet from each of an exercised plurality of interfaces of the plurality of interfaces; and receiving each of the transmitted broadcast packets on one or more of the plurality of interfaces; wherein the plurality of interfaces includes the exercised plurality of interfaces; analyzing the patterns of each particular broadcast packet transmitted from one of the exercised plurality of interfaces and on which of the plurality of interfaces said particular broadcast packet was received in order to determine a plurality of groupings of one or more of the plurality of interfaces; wherein a broadcast packet transmitted from an interface belonging to a grouping will be received on, and only on, a single interface in each of the other plurality of groupings.

In one embodiment, said grouping is defined as a single independent interface, or an aggregation of two or more interfaces combined into a single logical interface. One embodiment includes transmitting, by the networked particular machine, an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission. One embodiment includes: comparing said determined plurality of groupings with a predefined configuration; and providing a notification of whether the predefined configuration matches said determined plurality of groupings. In one embodiment, the exercised plurality of interfaces includes all of the plurality of interfaces. In one embodiment, said broadcast packets are Layer-2 frames.

One embodiment includes an apparatus, comprising: a plurality of network interfaces with each configured for sending and receiving packets over a communications link; and one or more processors with corresponding one or more memories configured to cause a broadcast packet to be transmitted from each of an exercised plurality of interfaces of the plurality of interfaces with said each of the transmitted broadcast packets to be received on one or more of the plurality of interfaces; wherein the plurality of interfaces includes the exercised plurality of interfaces; and wherein said one or more processors with corresponding one or more memories are configured to analyze the patterns of each particular broadcast packet transmitted from one of the exercised plurality of interfaces and on which of the plurality of interfaces said particular broadcast packet was received in order to determine a plurality of groupings of one or more of the plurality of interfaces; wherein a broadcast packet transmitted from an interface belonging to a grouping will be received on, and only on, a single interface in each of the other plurality of groupings.

In one embodiment, said grouping is defined as a single independent interface, or an aggregation of two or more interfaces combined into a single logical interface. In one embodiment, said one or more processors with corresponding one or more memories are configured to cause the transmission of an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission. In one embodiment, said one or more processors with corresponding one or more memories are configured to compare said determined plurality of groupings with a predefined configuration, and to cause notification of whether the predefined configuration matches said determined plurality of groupings. In one embodiment, the exercised plurality of interfaces includes all of the plurality of interfaces. In one embodiment, said broadcast packets are Layer-2 frames.

One embodiment includes a networked system, comprising: a first network node, including a plurality of interfaces with each configured for sending and receiving packets over a communications link, configured to perform operations including: transmitting a broadcast packet from each of an exercised plurality of interfaces of the plurality of interfaces; and receiving each of the transmitted broadcast packets on one or more of the plurality of interfaces; wherein the plurality of interfaces includes the exercised plurality of interfaces; wherein a broadcast packet transmitted from an interface belonging to a grouping will be received on, and only on, a single interface in each of the other plurality of groupings; one or more second nodes collectively including a plurality of particular network interfaces communicatively coupled to said links coupled to the exercised plurality of interfaces of the first node; wherein each particular second node of said one or more second nodes is configured to receive an identifiable broadcast packet and to forward said received identifiable broadcast packet from a single interface of the plurality of particular network interfaces of each grouping configured on said particular second node, not including the grouping corresponding to the interface on which the identifiable broadcast packet was received; and the first node, a second node of said one or more second nodes, or a third node configured to analyze the patterns of each particular broadcast packet transmitted from one of the exercised plurality of interfaces of the first node and on which of the plurality of interfaces of the first node said particular broadcast packet was received in order to determine a plurality of groupings of one or more of the plurality of interfaces.

Figure 1:
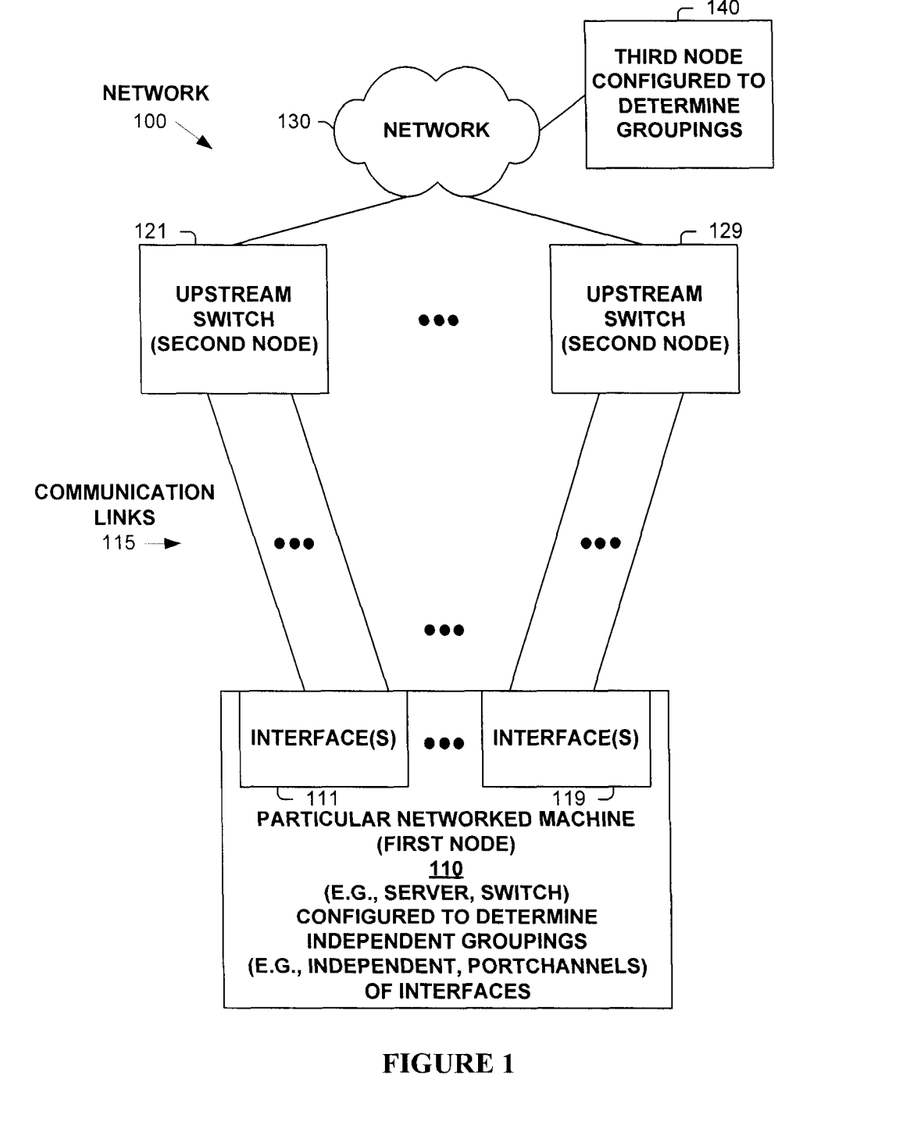
FIG. 1 illustrates an example network operating according to one embodiment.

Expressly turning to the figures, FIG. 1 illustrates an example network 100 operating according to one embodiment. Particular networked machine 110 includes multiple interfaces 111-119, which are communicatively coupled to communication links 115, and to upstream switches 121-129. Upstream switches 121-129 are typically communicatively coupled, such as via network 130, and typically when technology is used that allows a grouping of interfaces of a communications device (e.g., particular networked machine 110) over which communication is performed with multiple communications devices (e.g., different upstream switches 121-129).

Interfaces 111-119 of particular networked machine 110 can be considered to be independent, or part of an aggregation of two or more interfaces combined into a single logical interface. (Note, if one considers all interfaces as an aggregation of one or more interfaces combined into a single logical interface, then the teachings presented herein are still applicable). A particular interface can only be aggregated into a single logical interface (e.g., not be part of multiple PortChannels).

When interfaces are aggregated into a single logical interface, upper-layer protocols treat them as single interface, and a packet sent from the logical interface will result in one packet being sent over one of the aggregated links (in contrast to the packet being sent over multiple of the aggregative links). Thus, in normal operation of an upstream switch 121-129, when a broadcast packet (e.g., Layer-2 frame) is received on one of its interfaces, the broadcast packet will be sent out: each other independent interface, and (b) each other logical interface (e.g., meaning being sent out one of the aggregated interfaces of each logical interface). Note, the broadcast packet will not be sent out an interface (independent or aggregate) on which it was received.

Particular networked machine 110 is configured to send out broadcast packets out its interfaces (possibly all interfaces including each interface even though it is aggregated) and collect data on which interfaces the sent broadcast packet is received by particular networked machine 110. This collected data can then be analyzed, by particular networked machine 110 or another device with processing capability (e.g., a processor, blade, computer) to determine the different groupings of one or more interfaces, wherein a grouping may be a single, independent interface, or the interfaces that are aggregated into a single, logical interface. Based on these patterns of sent and received broadcast packets (e.g., Layer-2 frames have a destination broadcast address, and source address of a MAC address of the outbound interface of particular networked machine 110), the groupings of interfaces is determined based on the configuration of upstream switches 121-129 (e.g., what they consider corresponding independent and aggregated interfaces). This information can, for example, be displayed or otherwise provided to a network manager. Also, the configuration of the interfaces of particular networked switch 110 can be compared with the determined groupings with this comparison result, for example, be displayed or otherwise provided to a network manager. Thus, by automatically determining these groupings, a networked device can identify how the interfaces of peer communications systems communicatively coupled to its interfaces are configured, and whether the configurations are compatible or there is a configuration error.

In one embodiment, network 100 includes a third network node 140, which is configured to analyze the patterns of sent and received broadcast packets to determine the grouping (e.g., rather than first node 110 or one or more second nodes 121-129). Thus, this analysis can be offloaded from a switch to another device (e.g., computer, network management system, etc.).

Figure 2:
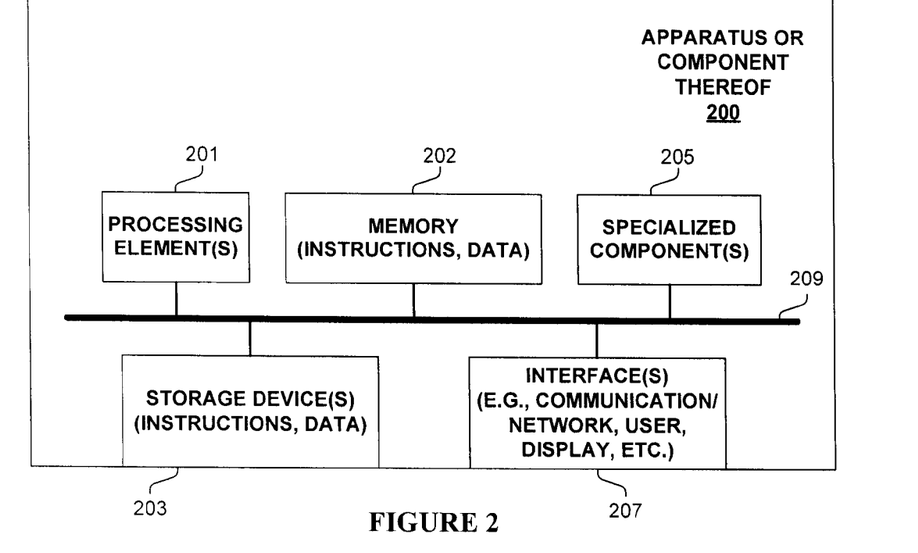
FIG. 2 illustrates an example system or component thereof used in one embodiment.

FIG. 2 is block diagram of an apparatus or component 200 used in one embodiment associated with automatically determining groupings of communications interfaces. In one embodiment, apparatus or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing data analysis, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, one or more particular networked machines, upstream switches, computing devices, communications devices, or other devices described herein.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

FIGS. 3A-E illustrate a process performed in one embodiment, and will be explained in terms of an example wherein a particular networked machine has four interfaces (A, B, C, and D) communicatively coupled to remote devices. In order to determine the configuration of these remote devices (e.g., their ports and whether they are independent or aggregated), the particular networked machine will send broadcast packets from one or more of its individual interfaces (i.e., regardless of whether they are configured as an independent or aggregated interface).

In this example, a broadcast packet is sent out interface A with a single copy of the broadcast packet received on interface B. First, it is known that there are P groupings, where P is one more than the number of received broadcast packets. In other words, P is one (as one packet is sent from a different grouping than received on) plus one grouping for each packet received (as one packet is received in each grouping other than the sending grouping). Remember, a remote switch will not forward a broadcast packet on a same interface of a grouping on which it was received, and will forward a single packet out each other grouping of interfaces. Thus, in this example, it is known that there are two groupings of interfaces (i.e., as one broadcast packet was received, and one plus one is two). Also, because it was sent on interface A and received on interface D, then A and D must be in different groupings.

Figure 3A:
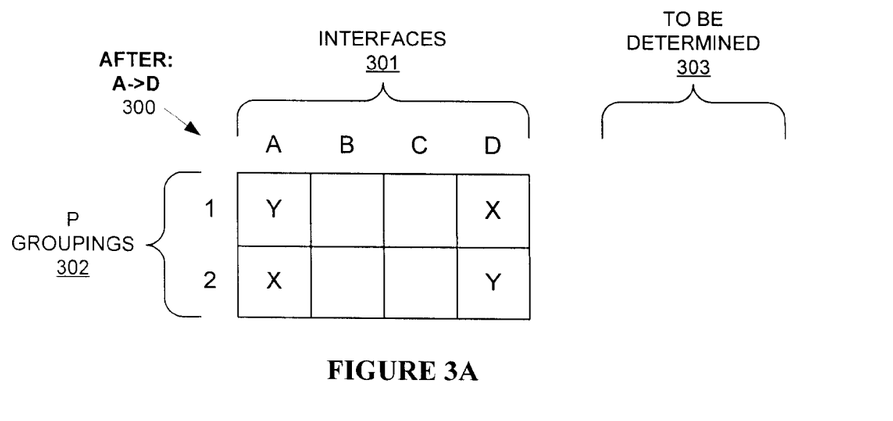
FIGS. 3A-E illustrate a process performed in one embodiment.

This information is reflected in FIG. 3A. Shown is matrix 300, created and populated after sending the broadcast packet from interface A and receiving on interface D. The columns of matrix 301 are each of the four interfaces; and the rows of matrix 302 are the different groupings, which are two in number based on the initial number of packets received in response to sending the broadcast packet out interface A. Further, known is that A and D are in different groupings, so each of them is marked as being in a different single grouping. (Note, a 'Y' represents in the grouping, and 'X' indicates not in the grouping). At this point there is nothing in the To Be Determined (TBD) data structure 303.

Figure 3B:
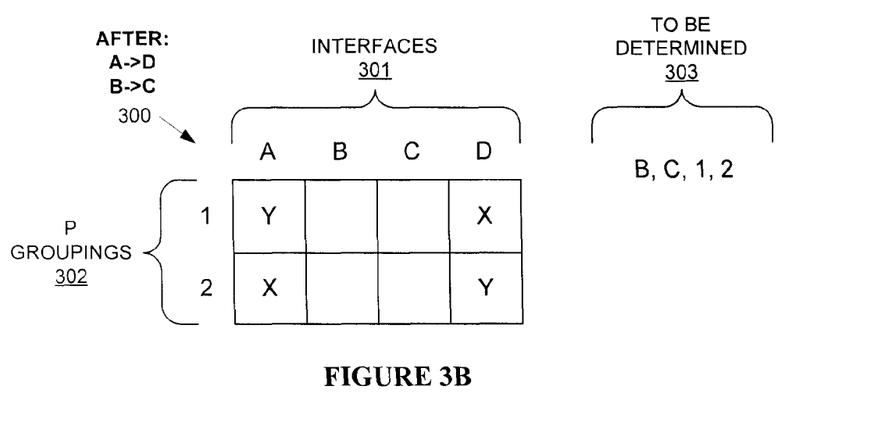

Next, with reference to FIG. 3B, in our example, a broadcast packet is sent out interface B, with the broadcast packet being received on interface C. Therefore, known is that B and C are in different groupings. However, there is not enough information yet to know in which grouping (1, 2) either B or C should be placed. Therefore, an entry is added in TBD data structure 303 of interfaces B and C as well as which groupings they may be placed, which are 1 and 2 in this example. (Note, the interfaces are also included as when there are more groupings, some of the groupings may be eliminated from placing one of the listed interfaces). Thus, TBD data structure 303 reflects that B and C are part of different groupings of 1 and 2, but it is not known which grouping (1, 2) contains which interface (A, B).

Figure 3C:
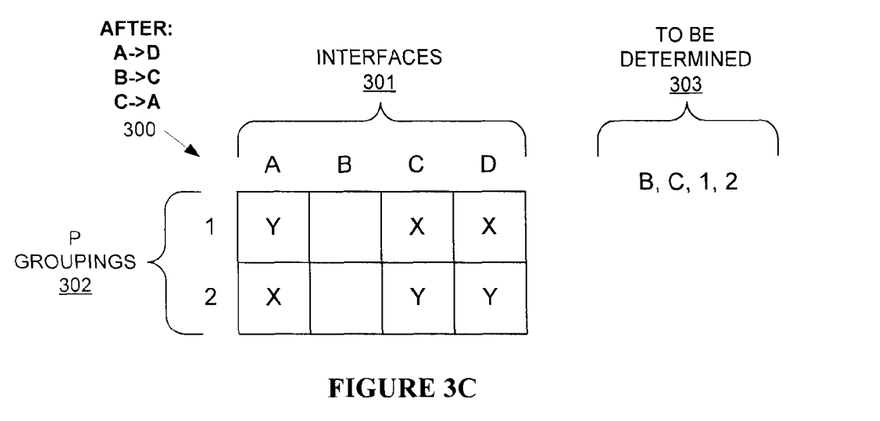

Next, with reference to FIG. 3C, in our example, a broadcast packet is sent out interface C, with the broadcast packet being received on interface A. Therefore, know is that A and C are in different groupings. Since matrix 300 already reflects that interface A is in grouping 1, then C must be in grouping 3, which is reflected in FIG. 3C.

Figure 3D:
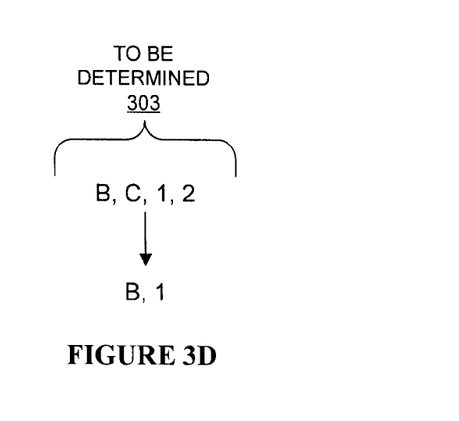
Figure 3E:
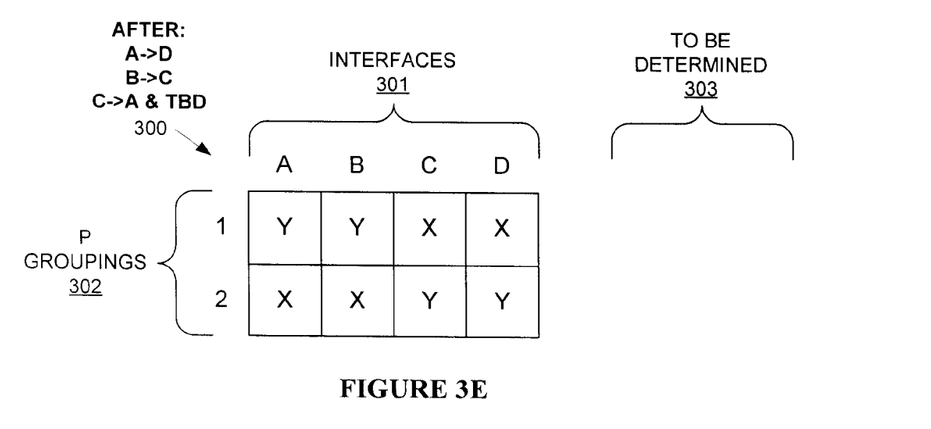

One embodiment continues to send out a broadcast packet out all other interfaces before processing TBD data structure 303; while in one embodiment, TBD data structure 303 is now processed such as in our example, reflected in FIG. 3D. From the previous operation, and as reflected in matrix 300 in FIG. 3C, it is known that interface C is in group 2. Therefore, the entries(s) of TBD data structure 303 can be updated to remove C and 2 from them. If this results in a single interface (and hence a single grouping), then matrix 300 is updated accordingly, such as illustrated in FIG. 3E in our example as it is now know that interface B is part of grouping 1, and remove the entry from TBD data structure 303. Therefore, looking at matrix 300 in FIG. 3E, it has been determined that interfaces A and B are in a first grouping (e.g., in a same PortChannel), and interfaces C and D are in a second grouping—according to the configuration of the remote switches. In one embodiment, this information is compared to the configuration of the device that sent the broadcast packets to determine whether or not it is also configured in this manner. If one or more differences are detected, corrective action such as error notification or automatic correction of the network configuration can be performed.

Note, in some configurations and based on the hashing algorithms of the remote switches in determining which interface of a grouping of multiple interfaces to send a packet, complete information may not be obtained by sending a single packet from each interface. Returning to the previous example, if the interfaces <sent from, received on> were: <A,D>, <B,C>, <C,B>, and <D,A>, it can be determined that there are two groupings, with A and D in different groupings, and B and C in different groupings. However, this information (e.g., based on the symmetric responses of the groupings) does not identify whether A is in a same grouping as B or C, or whether D is in a same grouping as B or C. In order to determine this, one embodiment performs remedial action, such as by, but not limited to: using another technology such as Cisco Discovery Protocol (CDP) or Link Aggregation Control Protocol (LACP) to gain additional information; and/or by sending one or more broadcast packets out an interface with these packets containing a pattern to cause it to be returned on a different interface of a grouping. (Note, PortChannels typically have a hashing function that load balances traffic among its interfaces and corresponding links; thus, it is possible to leverage the load balancing algorithm to generate additional information for determining the groupings.)

Figure 4A:
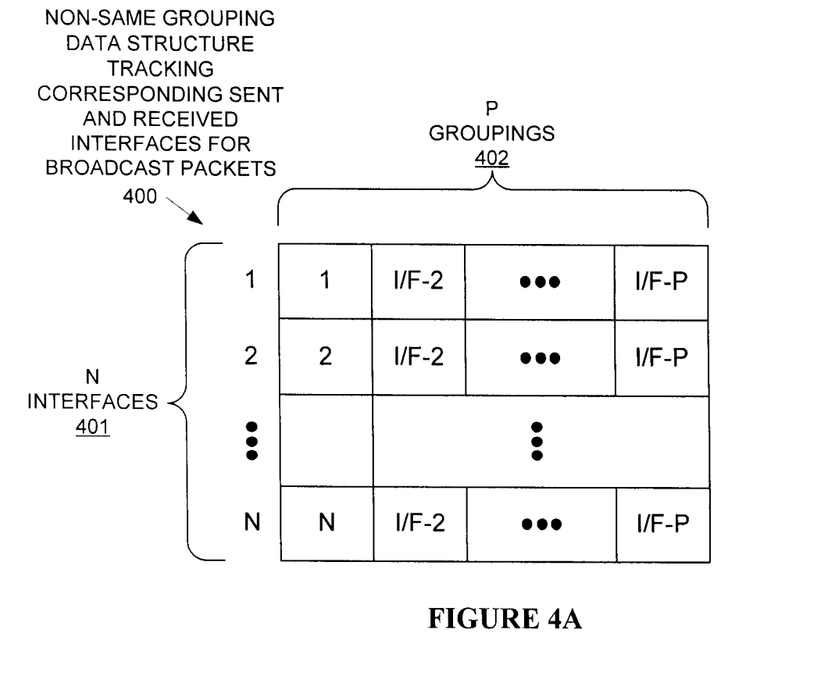
FIGS. 4A-C illustrate data structures used in one embodiment.
Figure 4B:
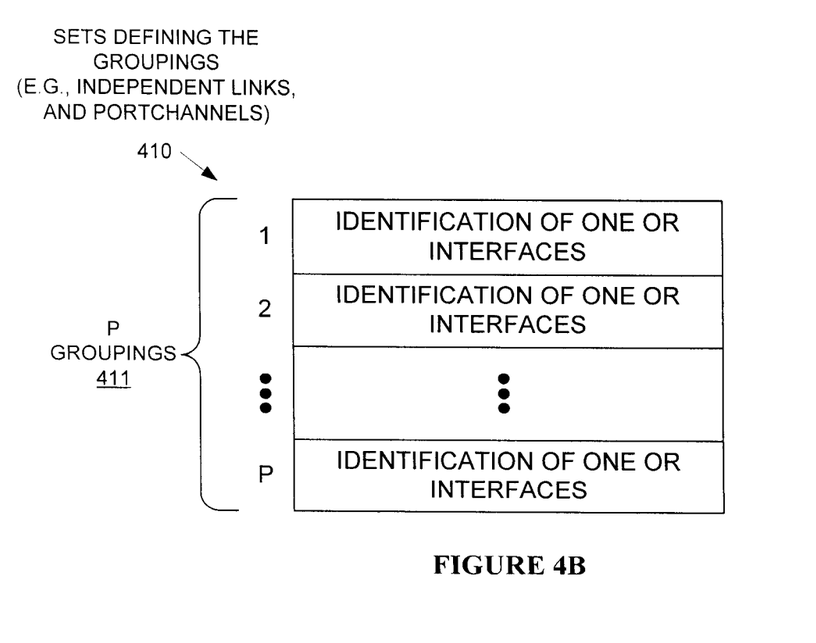
Figure 4C:
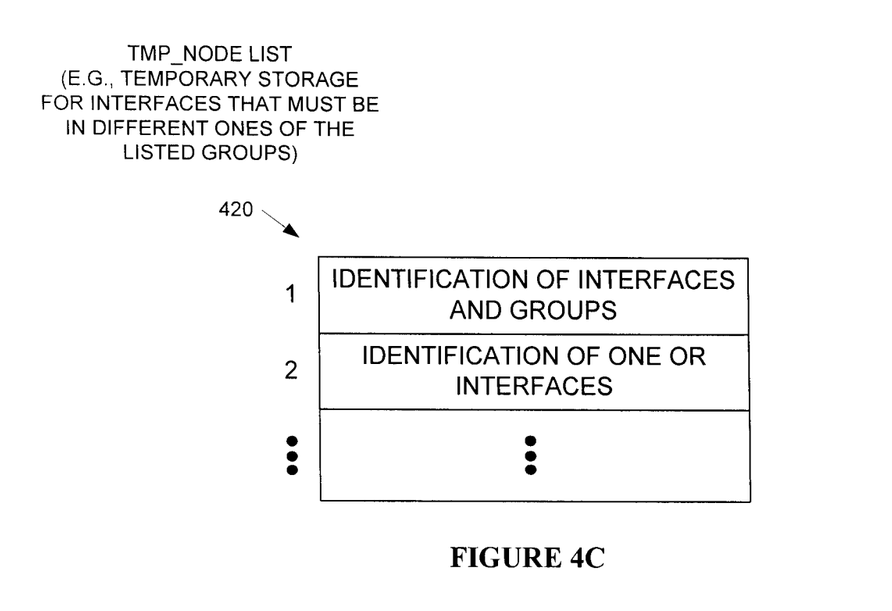
Figure 5A:
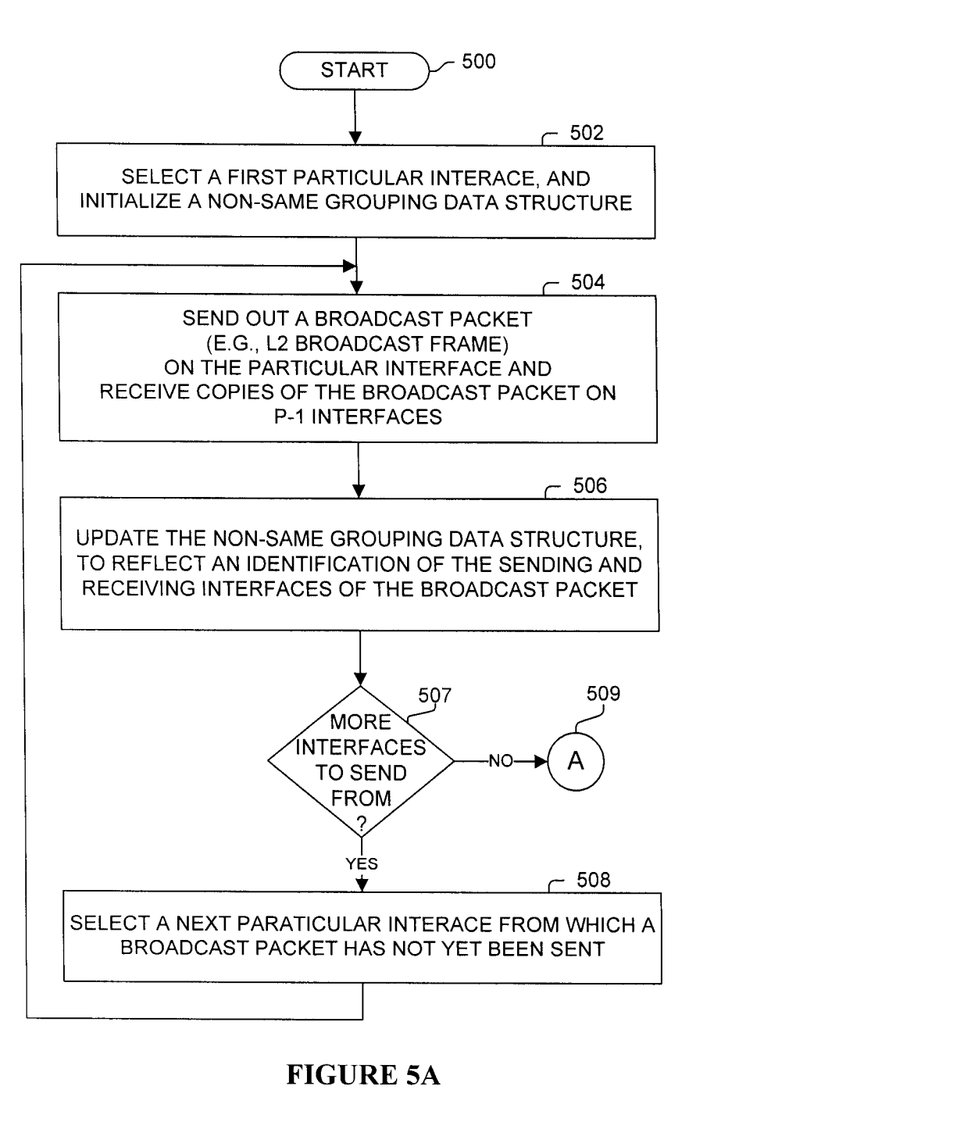
FIGS. 5A-C illustrate a process performed in one embodiment.
Figure 5B:
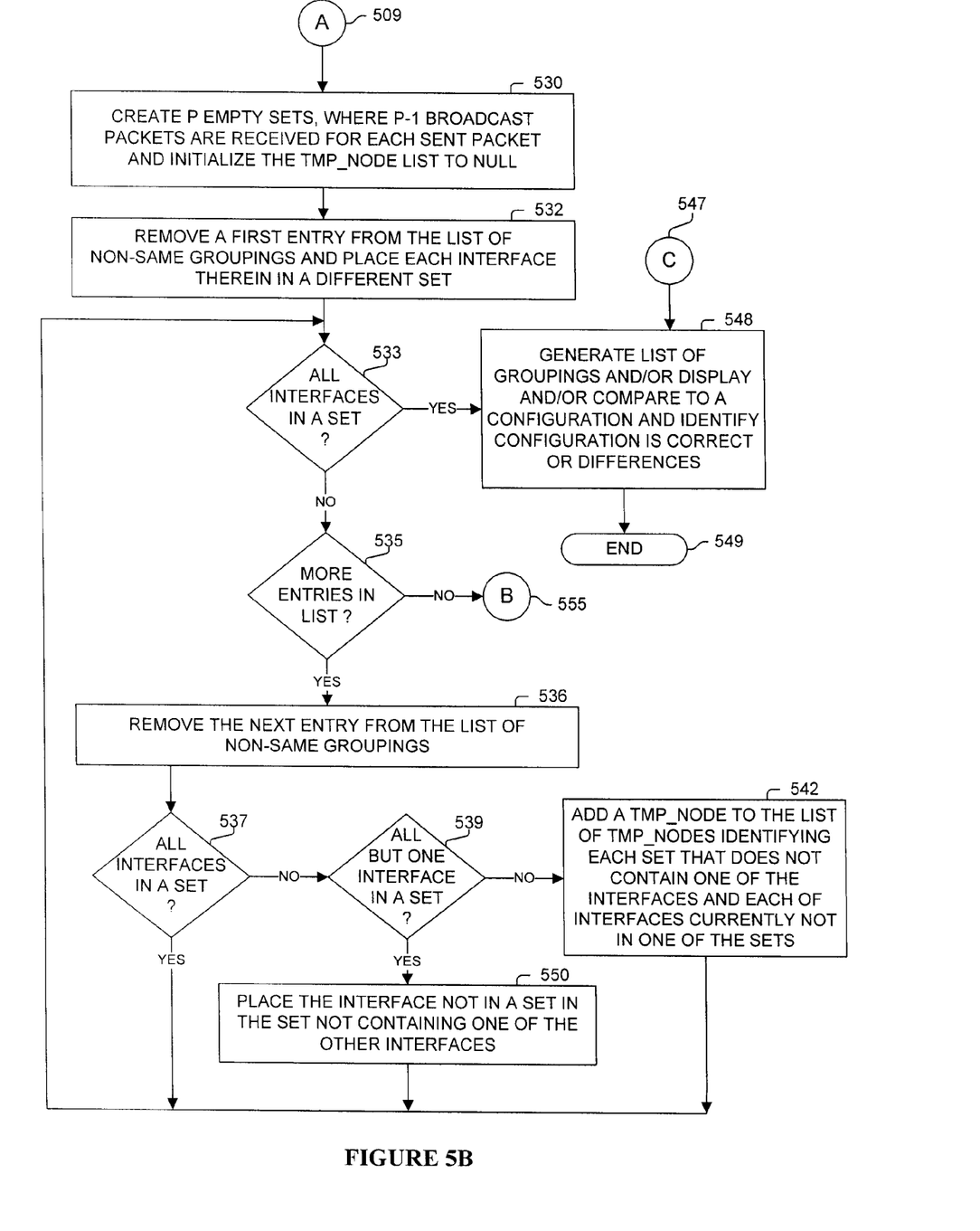
Figure 5C:
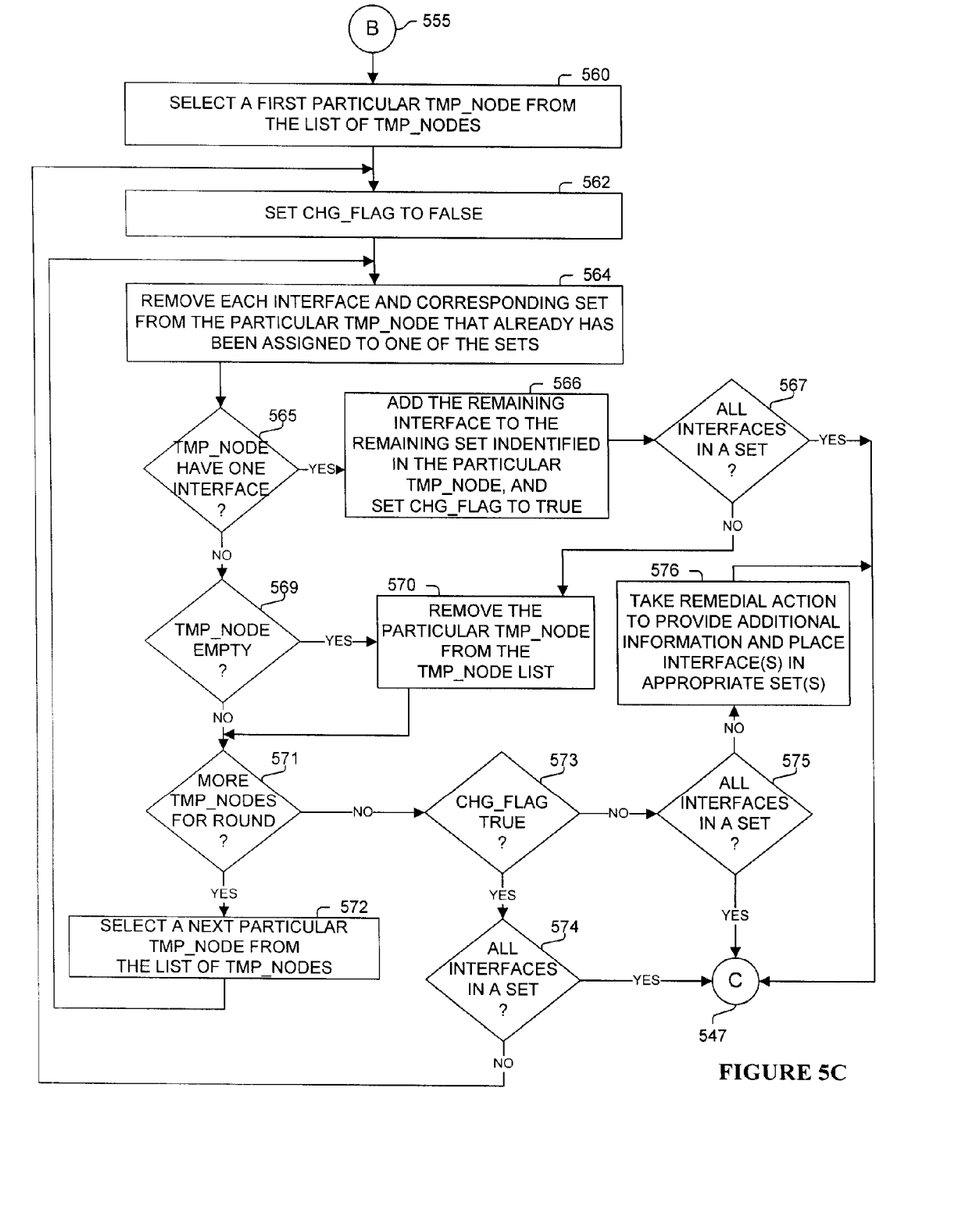

FIGS. 4A-C illustrates data structures and FIGS. 5A-C illustrates a process performed in one embodiment associated with automatically determining groupings of communications interfaces. Note, many different data structures, such as lists, linked lists, arrays, matrices, tables, etc., can be used in one embodiment; with the type used typically selected based on a subjective preference of the implementer of the embodiment. Similarly, there are many different variations of the embodiments possible that determine the groupings based on the patterns of sent and received broadcast packets.

FIG. 4A illustrates a non-same grouping data structure 400 tracking corresponding sent and received interfaces for broadcast packets. For example, one embodiment (e.g., reflected in FIG. 5A) sends a broadcast packet out each interface and collects information for subsequent analysis (e.g., reflected in FIGS. 5B-C). Thus, in one embodiment, non-same grouping data structure 400 has one row 401 for each of the N interfaces, with P columns 402, with P being the number of groupings (e.g., determined based on the number of broadcast packets received in response to a sent broadcast packet). Each row 401 stores P interfaces from which a broadcast packet was sent and on which the broadcast packet was received.

FIG. 4B illustrates data structure 410 for storing sets of interfaces in each of the P groupings. A set is simply one type of data structure that can be used in an embodiment, with the previous example using a matrix as another example of a data structure that can be used in one embodiment. Each of the P rows 411 stores a list/set of interfaces in the particular grouping (e.g., rather than storing an indication that an interface is part, not part, or unknown as in the matrix used the previous example).

FIG. 4C illustrates a data structure 410 for storing a list/set of identified groups and interfaces that have yet to be resolved. Data structure 410 corresponds to the To Be Determined data structure illustrated in the previous example.

Turning to the processing of FIGS. 5A-B, processing begins with process block 500 of FIG. 5A. Note, in FIG. 5A, a broadcast packet is sent out each of the interfaces, with the results stored for subsequent analysis, such as in, but not limited to, non-same grouping data structure 400 of FIG. 4A. In process block 502, an initialization step is performed to select a first particular interface and to initialize the non-same group data structure. In process block 504, a broadcast packet (e.g., L2 broadcast frame) is sent out of the particular interface, with copies received on P-1 interfaces. In process block 506, the non-same grouping data structure is updated to reflect the sending and receiving interfaces of the broadcast packet. As determined in process block 507, if there are more interfaces remaining to send from, then in process block 508, selected is a next particular interface from which a broadcast packet has not yet been sent. When a broadcast packet has been sent from each interface as determined in process block 507, processing continues to FIG. 5B as indicated by connector A 509.

In a nutshell, the process illustrated in FIG. 5B initializes the data structures and first allocates interfaces from the first entry of the non-same groupings to each of the different groupings (as they are known to be in different groupings, so each one is added to a different one of the empty sets). From there, the list of non-same groupings is sequenced through, and those interfaces for which there is enough information is added to a grouping set. If there is not enough information to add all of these interfaces to a grouping set, then the interfaces and sets for which there is not enough information are listed in an entry added to TMP_NODE list for later processing (e.g., by that of FIG. 5C). Note, when all interfaces have been allocated to a grouping set, then processing is complete.

Expressly turning to FIG. 5B and proceeding from connector A 509, processing continues to process block 530, wherein P empty sets are created (e.g., corresponding to data structure 410 of FIG. 4B) wherein P is the number of different groupings, known from P-1 packets being received from a sent broadcast packet. Note, if a different number of packets is returned for a sent broadcast packet, error processing is performed, which may include starting over, notifying a network manager, etc. Additionally, the TMP_NODE list is initialized to null (corresponding to data structure 420 of FIG. 4C). In process block 532, a first entry of the list of non-same groupings is removed, and each interface identified therein is placed in a different one of the grouping sets (as it is known that each interface is in a different grouping, so they just need to go into different groupings).

As determined in process block 533, when all interfaces are in a grouping set, then the analysis is complete, and processing proceeds to process block 548, wherein a list of groupings (e.g., the grouped interfaces) is generated, and/or displayed, and/or compared to a configuration of the particular networked machine, with the correctness or any differences displayed or otherwise communicated to a network manager or operating system. Processing of the flow diagrams of FIGS. 5A-C is complete as indicated by process block 549.

Otherwise, as determined in process block 535, while there are more entries in the list of non-same groupings, one entry is removed in process block 536. As determined in process block 537, if all of the interfaces listed in the entry are already in a grouping set, then processing returns to process block 533. Otherwise, as determined in process block 539, if all but one of the interfaces listed in the entry are already in a grouping set, then in process block 550, that one interface is added to the grouping set that does not contain one of the other listed interfaces; and processing returns to process block 533. Otherwise, in process block 539, a TMP_NODE entry is added to the list of TMP_NODES, with this entry identifying each grouping set that does not contain one of the listed interfaces and each of the interfaces not currently in one of the grouping sets (e.g., as described in relation to the To Be Determined list of FIGS. 3A-E); and processing returns to process block 533. When there are no more entries in the list of non-same groupings, processing continues to FIG. 5C as indicated by connector B 555. Note, from the decision of process block 533, it is known that not all interfaces have been placed in a grouping set, and from process block 535, it is known that there are no more entries in the non-same grouping data structure to process, so the entries in the TMP_NODE data structure are processed.

In a nutshell, the process illustrated in FIG. 5C sequences through the TMP_NODE entries, and removes any known interfaces and their assigned groupings from each entry. The TMP_NODE node entry is removed if it becomes empty. If this elimination processing removes all but one interface and one grouping, that interface is assigned to that grouping and the CHG_FLAG is set to indicate that a grouping has changed, so resequencing through the TMP_NODE list might be fruitful. When all interfaces have been assigned to a grouping, the processing is done. Also, if sequencing through TMP_ NODES list leaves unknown assignments (e.g., as previously discussed herein), remedial action (e.g., sending out additional packets to manipulate the hashing of one or more of the PortChannels) is performed to get more information to complete the assignment of interfaces to groupings.

Expressly turning to FIG. 5C and proceeding from connector B 555, processing continues to process block 560, wherein a first particular TMP_NODE entry is selected.

In process block 562, CHG_FLAG is set to false (indicating no new assignment of interfaces to groupings).

In process block 564, each already assigned interface and its corresponding grouping is removed from the particular TMP_NODE entry. As determined in process block 565, if there is only one interface remaining in the particular TMP_ NODE entry, then in process block 566, this interface is added to the grouping identified in the particular TMP_NODE entry. As determined in process block 567, if all interfaces have been assigned to a grouping set, then processing returns to connector C 547 in FIG. 5B, and then to process block 548. Otherwise, in process block 570, the particular TMP_NODE entry is removed from the TMP_NODE list; and processing continues to process block 571. Otherwise, as determined in process block 569, if the particular TMP_NODE entry is now empty after the processing of process block 564, then in process block 570, the particular TMP_NODE entry is removed from the TMP_NODE list; and processing continues to process block 571. As determined in process block 571, if there are more TMP_NODE entries that have not been processed in this round (e.g., the list sequenced through entirely), then in process block 572, a next particular TMP_ NODE entry is selected, and processing returns to process block 564.

Otherwise, the entire TMP_NODE list has been sequenced through since last setting the CHG_FLAG to false in process block 562. As determined in process block 573, if the CHG_ FLAG is true (indicating one or additional assignments of interfaces to a grouping which may provide information for resolving additional interface assignments to be done as reflected in TMP_NODE list), then as determined in process block 574, if all interfaces have not been assigned to a grouping set, then processing returns to process block 562 to sequence through the TMP_NODE list again. Otherwise, processing returns to connector C 547 in FIG. 5B. Otherwise, as determined in process block 573, if CHG_FLAG is false, the processing proceeds to process block 575. As determined therein, if all interfaces have been assigned to a grouping set, then processing returns to connector C 547 in FIG. 5B. Otherwise, in process block 576, in order to determine more information and assign the remaining interfaces to a grouping set, remedial action is taken, such as by, but not limited to: using another technology such as Cisco Discovery Protocol (CDP) or Link Aggregation Control Protocol (LACP) to gain additional information; and/or by sending one or more broadcast packets out an interface with these packets containing a pattern to cause it to be returned on a different interface of a grouping. (Note, PortChannels typically have a hashing function that load balances traffic among its interfaces and corresponding links; thus, it is possible to leverage the load balancing algorithm to cause the broadcast packet to be returned on a different interface of a PortChannel, thus generating additional information for determining the groupings.) Processing then returns to connector C 547 in FIG. 5B, as all interfaces have been assigned to a grouping.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
transmitting, by a networked particular machine including a plurality of interfaces with each configured for sending and receiving packets over a communications link, a broadcast packet from each of an exercised plurality of interfaces of the plurality of interfaces; and receiving each of the transmitted broadcast packets on one or more of the plurality of interfaces of the networked particular machine; wherein the plurality of interfaces includes the exercised plurality of interfaces;
analyzing the patterns of a sending interface of the networked particular machine to receiving one or more interfaces of the particular machine of each particular broadcast packet transmitted from one of the exercised plurality of interfaces and on which of the plurality of interfaces of the networked particular machine said particular broadcast packet was received in order to determine a plurality of groupings of one or more of the plurality of interfaces;
wherein a broadcast packet transmitted from an interface belonging to a grouping will be received on, and only on, a single interface of the particular machine in each of the other plurality of groupings.

2. The method of claim 1, wherein said grouping is defined as a single independent interface of the networked particular machine, or an aggregation of two or more interfaces of the networked particular machine combined into a single logical interface.

3. The method of claim 2, including transmitting, by the networked particular machine, an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission.

4. The method of claim 2, comprising: comparing said determined plurality of groupings with a predefined configuration; and providing a notification of whether the predefined configuration matches said determined plurality of groupings.

5. The method of claim 2, wherein the exercised plurality of interfaces includes all of the plurality of interfaces.

6. The method of claim 2, wherein said broadcast packets are Layer-2 frames.

7. The method of claim 1, including transmitting, by the networked particular machine, an additional broadcast packet from a particular one of the exercised plurality of interfaces, wherein the additional broadcast packet contains an information pattern designed to cause the broadcast packet to be received on a different one of the plurality of interfaces of one of the plurality of groupings than that resulting from a previous broadcast packet said transmitted on the particular one of the exercised plurality of interfaces.

8. The method of claim 1, comprising: comparing said determined plurality of groupings with a predefined configuration; and providing a notification of whether the predefined configuration matches said determined plurality of groupings.

9. The method of claim 1, wherein the exercised plurality of interfaces includes all of the plurality of interfaces.

10. The method of claim 1, wherein said broadcast packets are Layer-2 frames.

11. A networked node, comprising:
a plurality of network interfaces with each configured for sending and receiving packets over a communications link; and
one or more processors with corresponding one or more memories configured to cause a broadcast packet to be transmitted from each of an exercised plurality of interfaces of the plurality of interfaces of the networked node with said each of the transmitted broadcast packets to be received on one or more of the plurality of interfaces of the networked node; wherein the plurality of interfaces of the networked node includes the exercised plurality of interfaces; and wherein said one or more processors with corresponding one or more memories are configured to analyze the patterns of a sending interface of the networked node to receiving one or more interfaces of the networked node of each particular broadcast packet transmitted from one of the exercised plurality of interfaces and on which of the plurality of interfaces said particular broadcast packet was received in order to determine a plurality of groupings of one or more of the plurality of interfaces;
wherein a broadcast packet transmitted from an interface belonging to a grouping will be received on, and only on, a single interface of the networked node in each of the other plurality of groupings.

12. The networked node of claim 11, wherein said grouping is defined as a single independent interface, or an aggregation of two or more interfaces combined into a single logical interface.

13. The networked node of claim 12, wherein said one or more processors with corresponding one or more memories are configured to cause the transmission of an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission.

14. The networked node of claim 12, wherein said one or more processors with corresponding one or more memories are configured to compare said determined plurality of groupings with a predefined configuration, and to cause notification of whether the predefined configuration matches said determined plurality of groupings.

15. The networked node of claim 12, wherein the exercised plurality of interfaces includes all of the plurality of interfaces.

16. The networked node of claim 12, wherein said broadcast packets are Layer-2 frames.

17. The networked node of claim 11, wherein said one or more processors with corresponding one or more memories are configured to cause the transmission of an additional broadcast packet from a particular one of the exercised plurality of interfaces, wherein the additional broadcast packet contains information designed to cause the broadcast packet to be received on a different one of the plurality of interfaces of one of the plurality of groupings than that resulting from a previous broadcast packet said transmitted on the particular one of the exercised plurality of interfaces; and wherein said analyzed patterns includes the particular one of the exercised plurality of interfaces and one or more of the plurality of interfaces on which the additional broadcast packet was received based on its said transmission.

18. The networked node of claim 11, wherein said one or more processors with corresponding one or more memories are configured to compare said determined plurality of groupings with a predefined configuration, and to cause notification of whether the predefined configuration matches said determined plurality of groupings.

19. The networked node of claim 11, wherein the exercised plurality of interfaces includes all of the plurality of interfaces.

20. A networked system, comprising:
a first node, including a plurality of interfaces with each configured for sending and receiving packets over a communications link, configured to perform operations including: transmitting a broadcast packet from each of an exercised plurality of interfaces of the plurality of interfaces of the first node; and receiving each of the transmitted broadcast packets on one or more of the plurality of interfaces of the first node; wherein the plurality of interfaces includes the exercised plurality of interfaces of the first node; wherein a broadcast packet transmitted from an interface of the first node belonging to a grouping will be received on, and only on, a single interface of the first node in each of the other plurality of groupings;
one or more second nodes collectively including a plurality of particular network interfaces communicatively coupled to said links coupled to the exercised plurality of interfaces of the first node; wherein each particular second node of said one or more second nodes is configured to receive an identifiable broadcast packet and to forward said received identifiable broadcast packet from a single interface of the plurality of particular network interfaces of each grouping configured on said particular second node, not including the grouping corresponding to the interface on which the identifiable broadcast packet was received; and
the first node, a second node of said one or more second nodes, or a third node configured to analyze the patterns of a sending interface of the first node to receiving one or more interfaces of the first node of each particular broadcast packet transmitted from one of the exercised plurality of interfaces of the first node and on which of the plurality of interfaces of the first node said particular broadcast packet was received in order to determine a plurality of groupings of one or more of the plurality of interfaces.

* * * * *